United States Patent
Robinson et al.

[11] Patent Number: 6,094,249
[45] Date of Patent: Jul. 25, 2000

[54] SPATIAL LIGHT MODULATOR AND DISPLAY WITH REDUCED ELECTRICAL CONNECTIVITY REQUIREMENT

[75] Inventors: Michael Geraint Robinson, Boulder, Colo.; Craig Tombling, Stadhampton, United Kingdom; Nicholas Mayhew, Oxford, United Kingdom; Paul Bonnett, Littlemore, United Kingdom; Michael John Towler, Botley, United Kingdom

[73] Assignee: Sharp Kabushiki Kaisha, Osaka, Japan

[21] Appl. No.: 09/124,655

[22] Filed: Jul. 29, 1998

[30] Foreign Application Priority Data

Jul. 31, 1997 [GB] United Kingdom ............ 9716112

[51] Int. Cl.[7] .................. G02F 1/1343; G02F 1/135
[52] U.S. Cl. .................. 349/141; 349/145; 349/147; 349/25
[58] Field of Search .................. 349/141, 143, 349/145, 147, 25

[56] References Cited

U.S. PATENT DOCUMENTS

| | | | |
|---|---|---|---|
| 3,609,002 | 9/1971 | Fraser et al. | 350/150 |
| 3,781,080 | 12/1973 | Aftergut | 349/141 |
| 3,981,559 | 9/1976 | Channin | 349/141 |
| 4,850,677 | 7/1989 | Okumura | 350/333 |
| 4,902,103 | 2/1990 | Miyake et al. | 350/336 |
| 5,233,449 | 8/1993 | Shioji et al. | 349/141 |
| 5,831,707 | 11/1998 | Ota et al. | 349/141 |
| 5,886,762 | 3/1999 | Lee et al. | 349/141 |
| 5,914,761 | 6/1999 | Ohe et al. | 349/141 |
| 5,986,740 | 11/1999 | Robinson et al. | 349/5 |
| 5,991,065 | 11/1999 | Nutt et al. | 359/245 |

FOREIGN PATENT DOCUMENTS

| | | |
|---|---|---|
| 000044637A | 1/1982 | European Pat. Off. . |
| 0501824 | 2/1992 | European Pat. Off. . |
| 0811872 | 12/1997 | European Pat. Off. . |
| 354043047A | 4/1979 | Japan . |
| 2313920 | 12/1997 | United Kingdom . |

OTHER PUBLICATIONS

J.R. Hughes et al.; Liquid Crystals, "A New Set of High Speed Matrix Addressing Schemes for Ferroelectric Liquid Crystal Displays", vol. 13, No. 4, pp 597–601, 1993.

Apte et al ; "Deformable Grating Light Valves for High–Resolution Displays", SID 93 Digest, pp 807–808, 1993.

P. W. H. Surguy, et al.; "The "Joers/Alvey" Ferroelectric Multiplexing Scheme", Ferroelectrics, vol. 122, pp. 63–79, 1991.

*Primary Examiner*—William L. Sikes
*Assistant Examiner*—Tarifur R. Chowdhury
*Attorney, Agent, or Firm*—Renner, Otto, Boisselle & Sklar LLP

[57] ABSTRACT

A spatial light modulator includes at least three picture elements, each of which includes a plurality of first elongate electrodes which are connected together and a plurality of second elongate electrodes which are connected together and which are interdigitated with the first electrodes. The first electrodes of a second of the picture elements are connected to the second electrodes of a first of the picture elements and the second electrodes of the second picture element are connected to the first electrodes of a third of the picture elements.

13 Claims, 9 Drawing Sheets

SPATIAL LIGHT MODULATOR AND DISPLAY WITH REDUCED ELECTRICAL CONNECTIVITY REQUIREMENT

TECHNICAL FIELD OF THE INVENTION

The present invention relates to a spatial light modulator and to a display. GB 2 313 920 and EP 0 811 872 disclose a diffractive spatial light modulator and display. A high resolution electrode structure is used to switch a ferroelectric liquid crystal (FLC) into fine pitch regions suitable for the diffraction of light, for instance for use in a high brightness projection display. Each picture element (pixel) is provided with an interdigitated electrode structure such that alternate strips of the FLC may be switched into the same optical state or into a different optical state. When all of the strips are switched to the same state, the pixel does not diffract light, which therefore passes through the pixel into the zero order of diffraction. An optical system for gathering light from the pixels is generally arranged not to gather light in this mode so that the pixel appears dark.

When alternate strips of the FLC are switched to different optical states, the pixel acts as a diffraction grating. For instance, the interdigitated strips of the FLC may apply different phase delays, such as 180°, to light passing therethrough. The pixel acts as a diffraction grating with light being diffracted into the non-zero diffraction orders where it is collected by the associated optical system so that the pixel appears bright.

Figure 1:
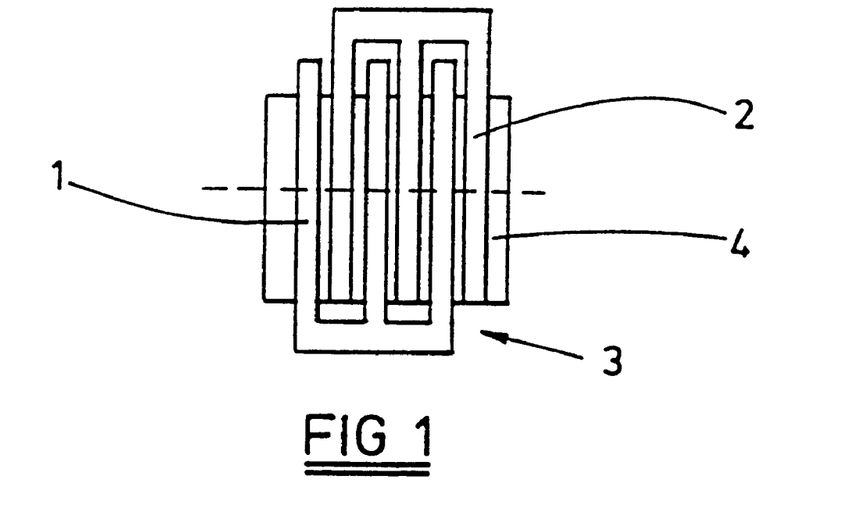
FIG. 1 illustrates a conventional electrode arrangement of a diffractive pixel.
Figure 2:
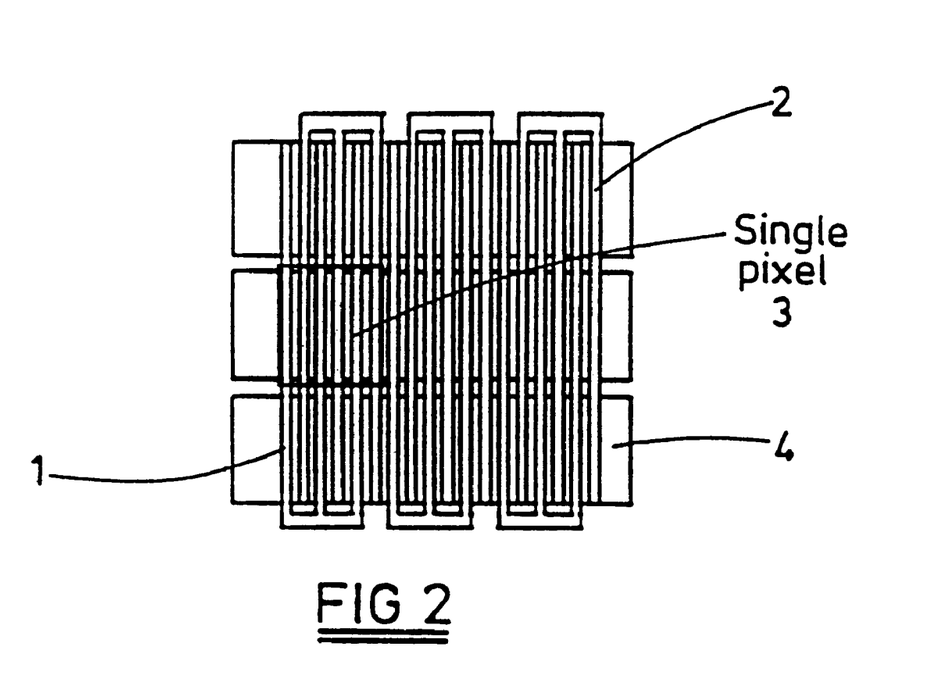
FIG. 2 illustrates the electrode arrangement of FIG. 1 applied to an array of pixels.

FIG. 1 of the accompanying drawings illustrates schematically the electrode arrangement of a single pixel whereas FIG. 2 of the accompanying drawings illustrates the electrode arrangement of a small display panel of this type comprising rows and columns of pixels. The electrode arrangement comprises a plurality of first elongate electrodes such as 1 which are connected together for receiving a first data signal for controlling the state of the FLC below the first electrodes 1. Second elongate electrodes such as 2 are interdigitated with the first electrodes 1 and connected together so as to receive another data signal for controlling the optical state of the FLC below the second electrodes 2. As shown in FIG. 2, the first and second electrodes extend along the columns of pixels and are common to the pixels such as 3 of each column. The first and second electrodes 1 and 2 are disposed on one side of the FLC (not shown) whereas third or row electrodes such as 4 are disposed on the other side of the FLC. The row electrodes 4 are connected to a strobe signal generator (not shown) for supplying a strobe signal in turn to the row electrodes 4. This arrangement forms a passive matrix addressing arrangement.

SUMMARY OF THE INVENTION

In order to control the optical state of each pixel, three independent connections are required to the first, second and third electrodes. When arranged as an array of pixels as shown in FIG. 2, the third or row electrodes 4 are common to the pixels of each row and the first and second electrodes 1 and 2 are common to the pixels of each column. A data signal generator (not shown) supplies data signals to the first and second electrodes 1 and 2 of each column so that two data connections are required for each column of pixels, despite the fact that the pixels operate in either of two modes, namely diffractive and non-diffractive. The data signal generator is therefore required to have two line drivers per column of pixels and each column of pixels has to be provided with two connection pads for connection to the data signal generator.

According to a first aspect of the invention, there is provided a spatial light modulator comprising at least three picture elements, each of which comprises a plurality of first elongate electrodes which are connected together and a plurality of second elongate electrodes which are connected together and which are interdigitated with the first electrodes, the first electrodes of a second of the picture elements being connected to the second electrodes of a first of the picture elements and the second electrodes of the second picture elements being connected to the first electrodes of a third of the picture elements.

It is thus possible to provide an arrangement in which the interdigitated electrodes are shared between pixels so that the number of connections, and hence the number of line drivers, can be reduced compared with the known arrangement. Thus, the cost of a spatial light modulator, for instance for use as a display panel, can also be reduced. The use of passive addressing techniques as opposed to active addressing techniques is intended to reduce costs because active substrates with associated fabrication costs and low yield can be avoided. The main cost of using the passive addressing technique is the number of independent drivers, for instance used to address columns and rows of pixels. The present invention allows the number of drivers to be approximately halved compared with the known technique described hereinbefore which results in a similar cost decrease. The cost advantage of passive addressing techniques over active techniques is thus maintained.

Another advantage of this arrangement is in the reduction of electrode pads (pin-outs) which are required to allow connection, for instance, to silicon based drivers through chip-on-glass or similar techniques. Such pin-outs occupy area and can be disadvantageous from the point of view of overall panel size. The reduction in pin-outs also increases fabrication yield during manufacture.

The modulator may comprise at least one row of n picture elements where n is an integer greater than 2, the first electrode of each ith picture element being connected to the second electrode of the (i−1)th picture element and the second electrode of each ith picture element being connected to the first electrode of the (i+1)th picture element, where i is each integer satisfying 1<i<n. For large numbers of picture elements in each row, the number of pin-outs and drivers is almost halved compared with the known arrangement illustrated in FIGS. 1 and 2. In particular, whereas the known arrangement requires 2n pin-outs and data signal generator drivers, the present invention requires only n+1 pin-outs and drivers.

The or each row may comprise a third electrode which is common to the n picture elements. Such an arrangement allows a passive matrix addressing technique to be employed.

The modulator may comprise a plurality of columns of picture elements, the first electrodes of the picture elements of each column being connected together and the second electrodes of the picture elements of each column being connected together. This allows the whole modulator to be addressed as a single unit. Alternatively, the modulator may comprise a plurality of groups of rows of picture elements, each group comprising a plurality of columns of picture elements, the first electrodes of the picture elements of each column of each group being connected together and the second electrodes of the picture elements of each column of each group being connected together. In this arrangement, the modulator is divided "horizontally" into several groups of rows (normally two) so that the groups can be addressed simultaneously. This reduces the frame refresh time of the modulator.

The first and second electrodes may be connected to a data signal generator.

The modulator may comprise an active matrix addressing arrangement connected to the first electrode of each of the picture elements.

Although applicable to other techniques, the modulator may include a layer of electro-optic material such as a liquid crystal, for instance a ferroelectric liquid crystal.

The picture elements may be arranged as groups of m adjacent picture elements of different areas, where m is an integer greater than 1. This allows spatial techniques to be used for providing grey levels and is advantageous in the case where the pixels are switchable between two stable states.

According to a second aspect of the invention, there is provided a display comprising a modulator in accordance with the first aspect of the invention, a light source for illuminating the modulator, and an optical system for gathering light from the modulator.

Displays of this type allow high brightness projected images to be achieved.

The optical system may be arranged to gather light diffracted by the picture elements (pixels) of the modulator. Thus, non-diffracting pixels appear dark whereas diffracting pixels appear light. Light from diffracting pixels which might contaminate the dark pixel image is thus reduced so that the display contrast ratio is increased.

The optical system may be a projection optical system.

BRIEF DESCRIPTION OF THE DRAWINGS

The invention will be further described, by way of example, with reference to the accompanying drawings, in which.

Like reference numerals refer to like parts throughout the drawings.

Figure 3:
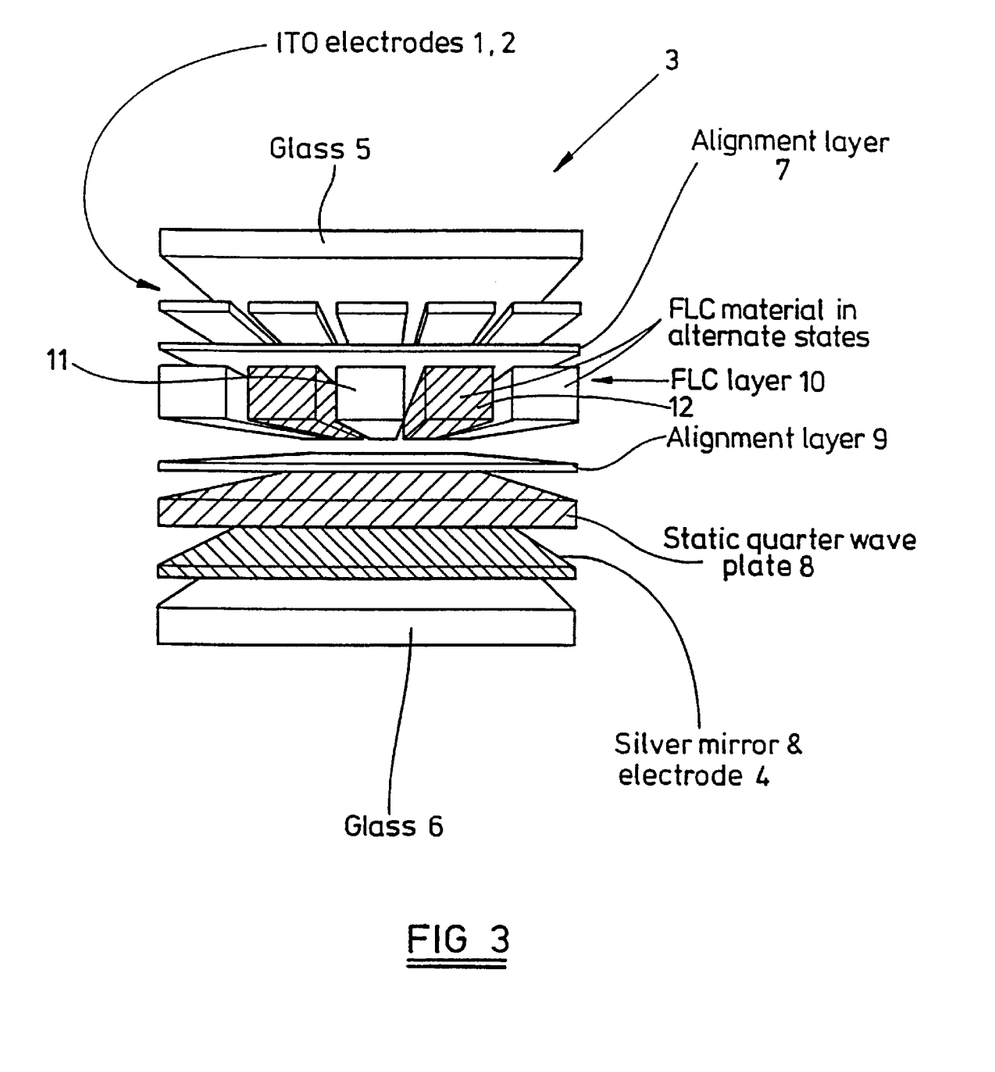
FIG. 3 is an exploded view of a pixel of an SLM constituting an embodiment of the invention.
Figure 4:
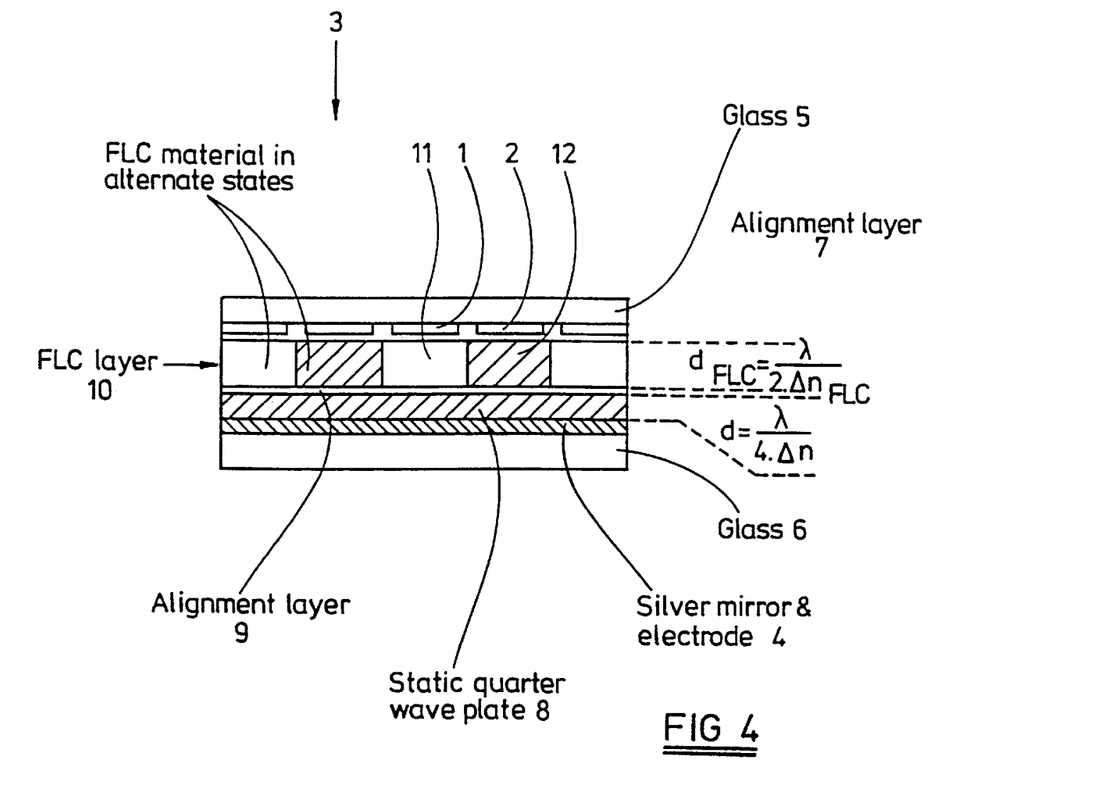
FIG. 4 is a cross-sectional view of the pixel illustrated in FIG. 3.

FIGS. 3 and 4 illustrate the structure of a pixel of a spatial light modulator (SLM) constituting an embodiment of the invention. The SLM constitutes a reflection-mode diffractive display panel comprising a rectangular array of rectangular or substantially rectangular pixels 3. The panel comprises upper and lower glass substrates 5 and 6. The upper substrate 5 is coated with a transparent conducting layer of indium tin oxide (ITO) which is etched to form the elongate interdigitated electrodes 1, 2 with a pattern as described hereinafter. The electrodes are covered with an alignment layer 7 for a ferroelectric liquid crystal material. In particular, the alignment layer 7 is formed by obliquely evaporating silicon oxide at 84° to the normal to the substrate 5 so as to induce the C1 state in a ferroelectric liquid crystal material, for instance of the type known as SCE8 available from Merck. The alignment layer 7 may have a thickness of approximately 10 nanometres.

DETAILED DESCRIPTION OF THE INVENTION

The third electrode 4 also forms a mirror and is formed on the glass substrate 6 by depositing silver to a thickness of approximately 100 nanometres. A static quarter wave plate 8 is formed on the silver mirror and electrode 4. The wave plate 8 may be provided by spinning on a mixture of reactive mesogen diacrylate RM257 in a suitable solvent such as toluene/xylene mix with a photoinitiator. This is cured for approximately 10 minutes under ultraviolet light in an atmosphere of nitrogen. The thickness of the plate 8 is controlled, for instance by varying the mix ratios of the materials and the spin speed, so that it acts as a quarter wave plate for a predetermined bandwidth in the visible spectrum, for instance, centred about 520 nanometres. The thickness d is given by $d=\lambda/4\Delta n$, where $\lambda$ is the wavelength of the centre of the band and $\Delta n$ is the difference between the ordinary and extraordinary refractive indices of the material of the quarter wave plate 8. The quarter wave plate 8 typically has a thickness of the order of 800 nanometres.

A further alignment layer 9 is formed on the quarter wave plate 8, for instance as described hereinbefore for the alignment layer 7. The substrates 5 and 6 are then spaced apart, for instance by spacer balls of two micrometre diameter, and stuck together so as to form a cell which is filled with the ferroelectric liquid crystal material to form a layer 10. The spacing provides a layer of ferroelectric liquid crystal material which provides a half wave of retardation so that the liquid crystal layer 10 acts as a half wave retarder whose optic axis is switchable. The ferroelectric liquid crystal layer 10 has a thickness d given by $d=\lambda/2\Delta n_{FLC}$, where $\Delta n_{FLC}$ is the difference between the ordinary and extraordinary refractive indices of the ferroelectric liquid crystal material.

In order to optimize the brightness of the display, the reflectivity of each interface should preferably be reduced, for instance by applying anti-reflection coatings to the substrate 5 and by optically burying the electrodes 1, 2.

By applying suitable waveforms between the electrode 4 and the electrodes 1 and 2, the layer 10 can be controlled so that the pixel is switched between diffractive and non-diffractive states. In the non-diffractive state, the FLC layer 10 is in the same optical state throughout the pixel 3. The pixel 3 thus acts as a specular reflector. In the diffractive state, alternate strips of the FLC layer 10 as indicated at 11 and 12 are in different optical states such that light passing through each strip 11 is shifted in phase by 180° relative to light passing through each strip 12. The pixel 3 thus acts as a phase-only diffraction grating to unpolarised incident light, which is diffracted into the non-zero diffraction orders.

Figure 5:
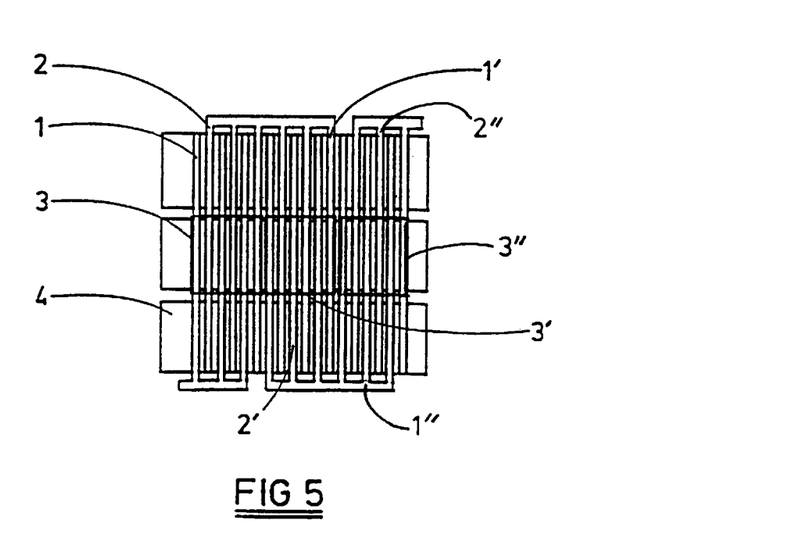
FIG. 5 illustrates an electrode arrangement of the SLM having the pixels shown in FIGS. 3 and 4.

FIG. 5 illustrates the arrangement of the first, second and third electrodes 1, 2 and 4 of the SLM shown in FIGS. 3 and 4. A first pixel 3 comprises the first and second electrodes 1 and 2 with the same arrangement as illustrated in FIG. 2. Second and third pixels 3' and 3" likewise comprise first electrodes 1' and 1" and second electrodes 2' and 2". The second electrodes 2 of the first pixel 3 are connected together and to the first electrodes 1' of the second pixel 3'. The second electrodes 2' of the second pixel 3' are connected together and to the first electrodes 1" of the third pixel 3". In general, the first electrodes of each pixel column are connected together and to the second electrodes of the adjacent pixel column to the left whereas the second electrodes of each pixel column are connected together and to the first electrodes of the adjacent pixel column to the right. For the left-most column of pixels, the first electrodes are not connected to other electrodes but the second electrodes are connected to the first electrodes of the next column. Similarly, the right-most column has second electrodes which are not connected to another column and first electrodes which are connected to the second electrodes of the adjacent column. Thus, for a pixel array comprising n columns of pixels, only n+1 column connections are required compared with 2n column connections in the case of the known electrode arrangement illustrated in FIGS. 1 and 2. The number of data signal generator drivers and pin-outs required for connection to the columns is therefore substantially reduced by almost 50%.

Figure 6:
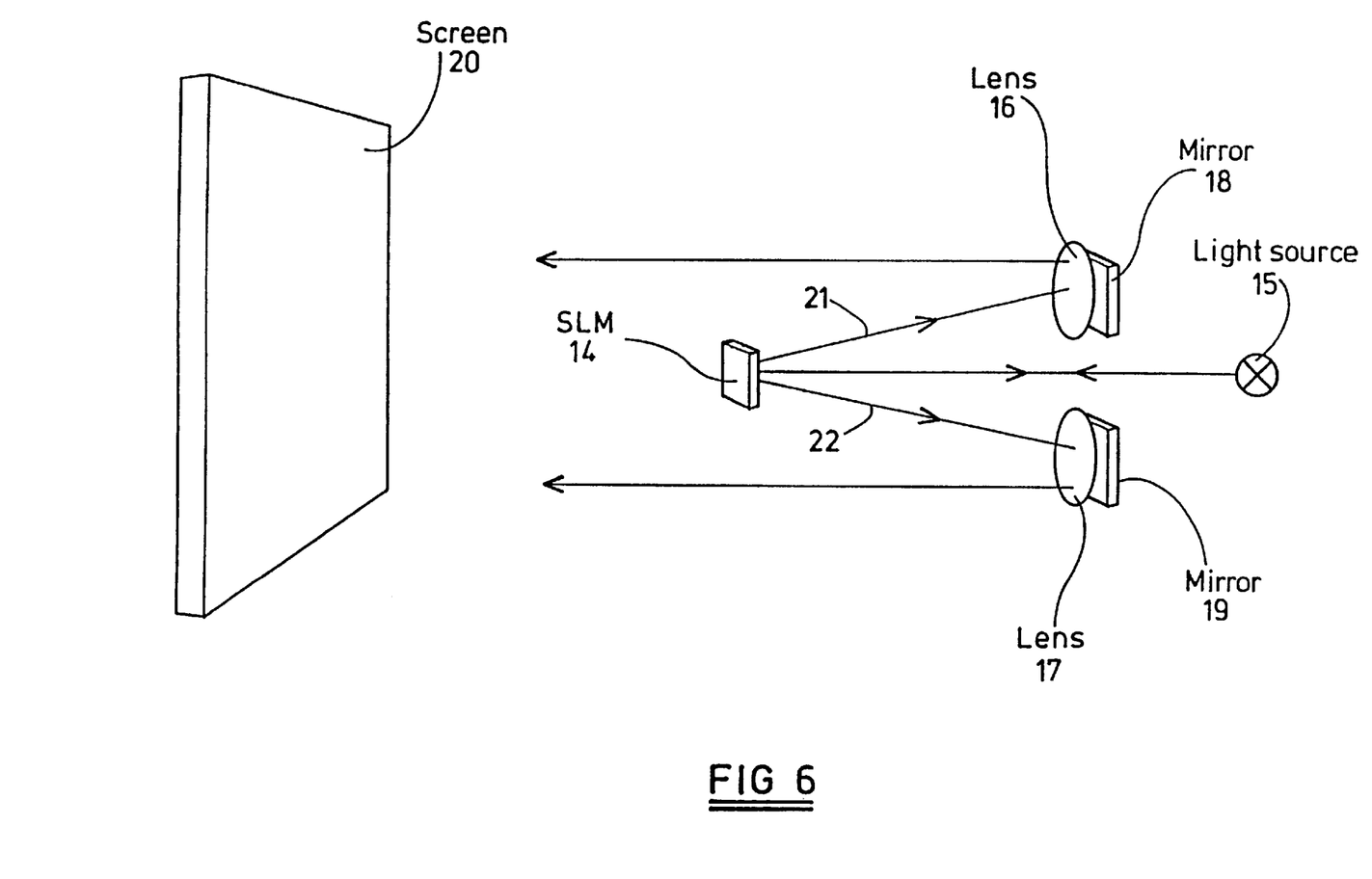
FIG. 6 is a schematic diagram of a projection display incorporating an SLM of the type shown in FIGS. 3 to 5.

FIG. 6 illustrates a projection display using an SLM 14 of the type shown in FIGS. 3 to 5. The SLM 14 is illuminated by a light source 15. Projection lenses 16 and 17 and mirrors 18 and 19 project an image displayed by the SLM 14 onto a screen 20.

Light from the light source 15 is incident normally on the SLM 14. Each pixel which is in the reflective mode reflects the incident light normally back so that the reflected light is not projected by the optical elements 16 to 19. Thus, a "dark" pixel is imaged on the screen 20. Each pixel in the diffractive mode deflects the incident light into the non-zero diffractive orders, mainly into the positive and negative first orders as illustrated by light rays 21 and 22. The light from each such pixel is thus imaged to a "bright" pixel on the screen 20.

Figure 7:
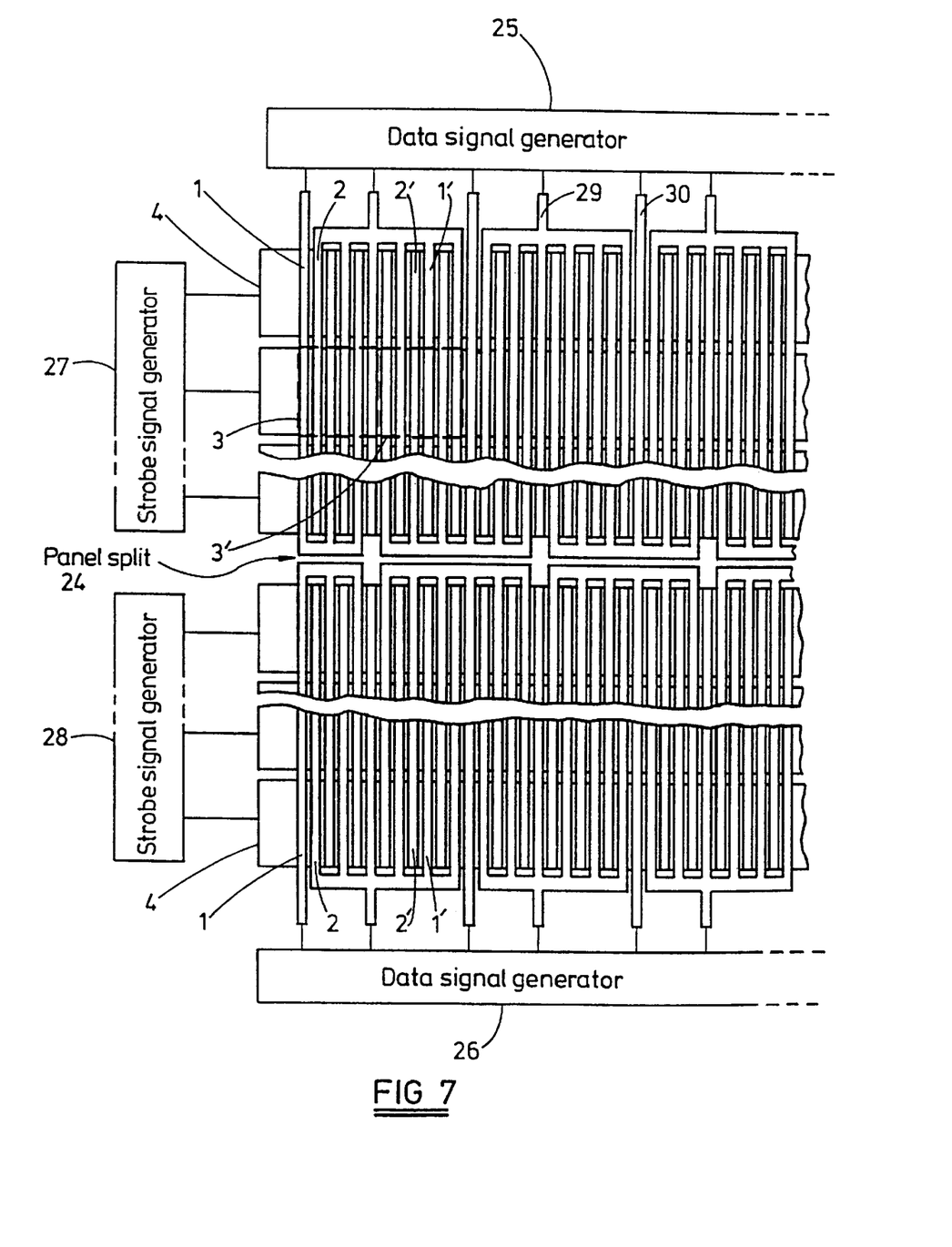
FIG. 7 illustrates the electrode arrangement and addressing arrangement of an SLM constituting another embodiment of the invention.

FIG. 7 illustrates an electrode arrangement and addressing circuitry of an SLM which is divided at a panel split line 24 into two substantially identical panels. The first and second electrodes 1, 2 are connected to an upper data signal generator 25 and a lower data signal generator 26 for the upper and lower halves of the panel. The strobe electrodes 4 are similarly connected to upper and lower strobe signal generators 27 and 28. The data and strobe signal generators 25 to 28 form the addressing circuitry for the whole panel relative to the upper and lower halves of the panel which are substantially independent of each other. Thus, these halves are addressed as two separate panels with each being addressed one row at a time. Accordingly, the frame refresh period of the whole panel may be halved or the line address time may be doubled.

The layout for the first and second electrodes 1, 2 shown in FIG. 7 is such that these electrodes can be contained within a single plane. This avoids the need for double layer lithography to create the electrode pattern in two layers with interconnections where necessary between the layers. However, each half of the panel is electrically asymmetrical. For instance, the electrodes connected to the conductor 29 are connected with a short conductive path to the data signal generator 25 whereas the electrodes connected to the conductor 30 are connected via a higher resistance path.

Figure 8:
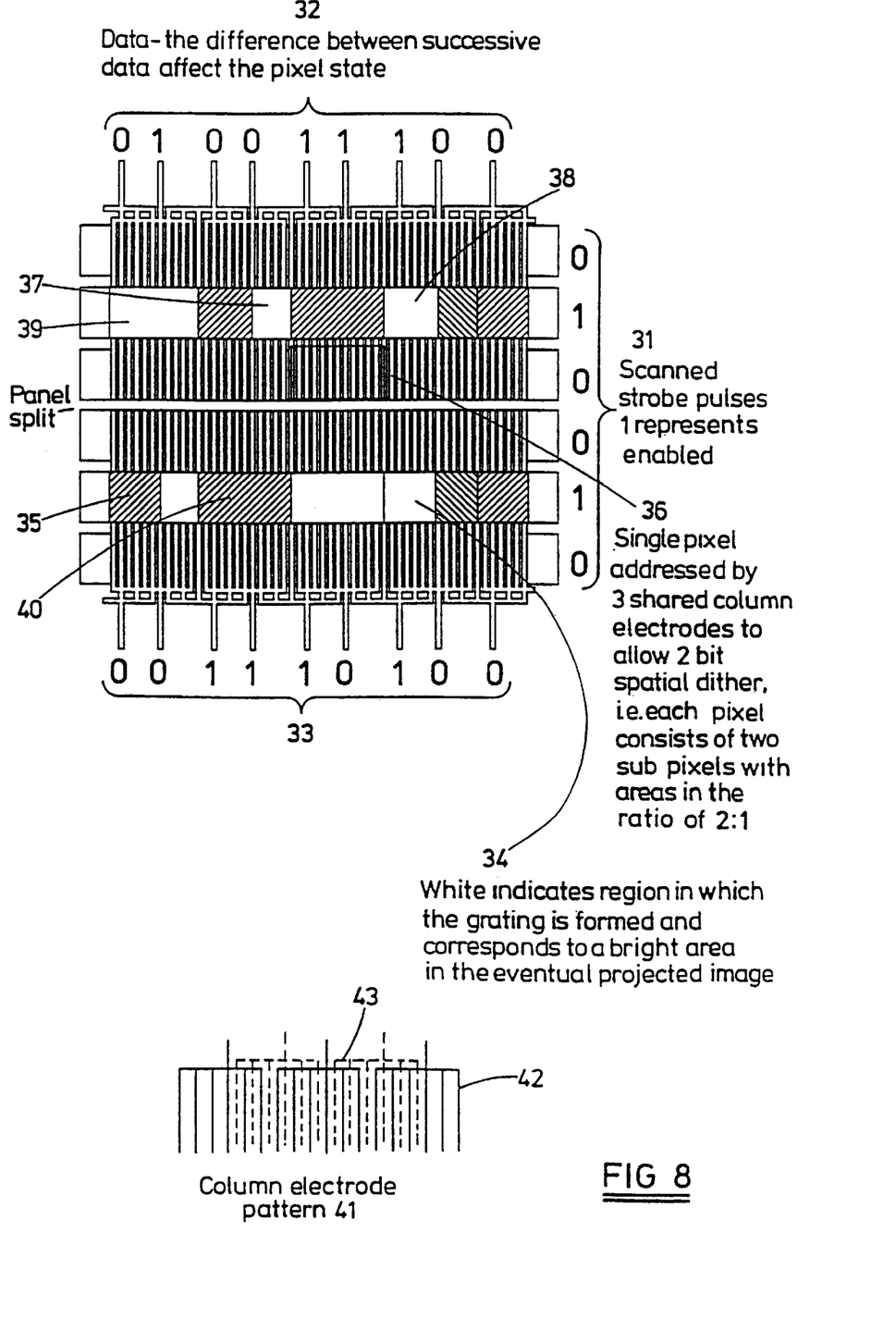
FIG. 8 is a schematic view of an electrode arrangement and an addressing scheme for an SLM of the type shown in FIG. 7.

FIG. 8 illustrates the technique required for addressing an SLM panel of the type shown in FIG. 7. The strobe pulses are represented by the "0s" and "1s" indicated at 31, where a "1" represents a strobe pulse being applied to a strobe electrode for refreshing a row of pixels. For the sake of simplicity of illustration, the panel shown in FIG. 8 comprises 3 upper rows and 3 lower rows with the middle row of each half of the panel being strobed.

The data signals which are simultaneously applied to the first and second electrodes in synchronism with the strobe pulses are also illustrated by "0s" and "1s" as shown as 32 and 33. Thus "0" represents a first voltage for switching the strips of FLC to a first optical state and "1" represents the second voltage for switching the strips of FLC to a second optical state. If the first and second electrodes of a pixel are switched to the same state, then the pixel is in the non-diffractive state irrespective of which optical state the strips are in. Similarly, if the first and second electrodes are connected to different voltages, the pixel is switched to the diffractive state irrespective of which voltages are applied to which of the first and second electrodes. Accordingly, the pixels are switched to the diffractive state where adjacent electrodes are connected to different voltages. This is indicated, for instance at 34, by a white region whereas non-diffractive pixels are indicated by shaded regions such as 35.

The use of FLC in an SLM where the pixels are diffractive or non-diffractive means that it is difficult or impossible to achieve grey levels in each pixel. In other words, each pixel is either bright or dark with no other grey levels being available.

In order to provide grey level capability, the individual pixels may be grouped together and operated in such a way as to provide what is known as "spatial dither". By appropriately selecting the layout of the first and second electrodes, the individual pixels of each group forming a composite pixel can have different areas, for instance increasing logarithmically from the smallest to the largest with the areas of adjacent pixels being in the ratio of 2:1. This is illustrated in FIG. 8 for 2 bit spatial dither as shown by the outline 36 where a single composite pixel is formed by 2 individual or sub pixels with areas in the ratio of 2:1. This allows 2 intermediate grey levels, as indicated at 37 and 38, to be achieved in addition to the "white" level 39 and the "black" level 40. Thus, spatial resolution may be sacrificed in order to provide grey level capability.

The column electrode pattern is illustrated at 41 in FIG. 8. Electrodes represented by unbroken lines such as 42 form one layer whereas electrodes indicated by broken lines 43 form another layer. Such an arrangement allows electrical symmetry to be achieved between the electrodes but requires a two level arrangement with interconnections between the levels, for instance to the data signal generators.

Figure 9:
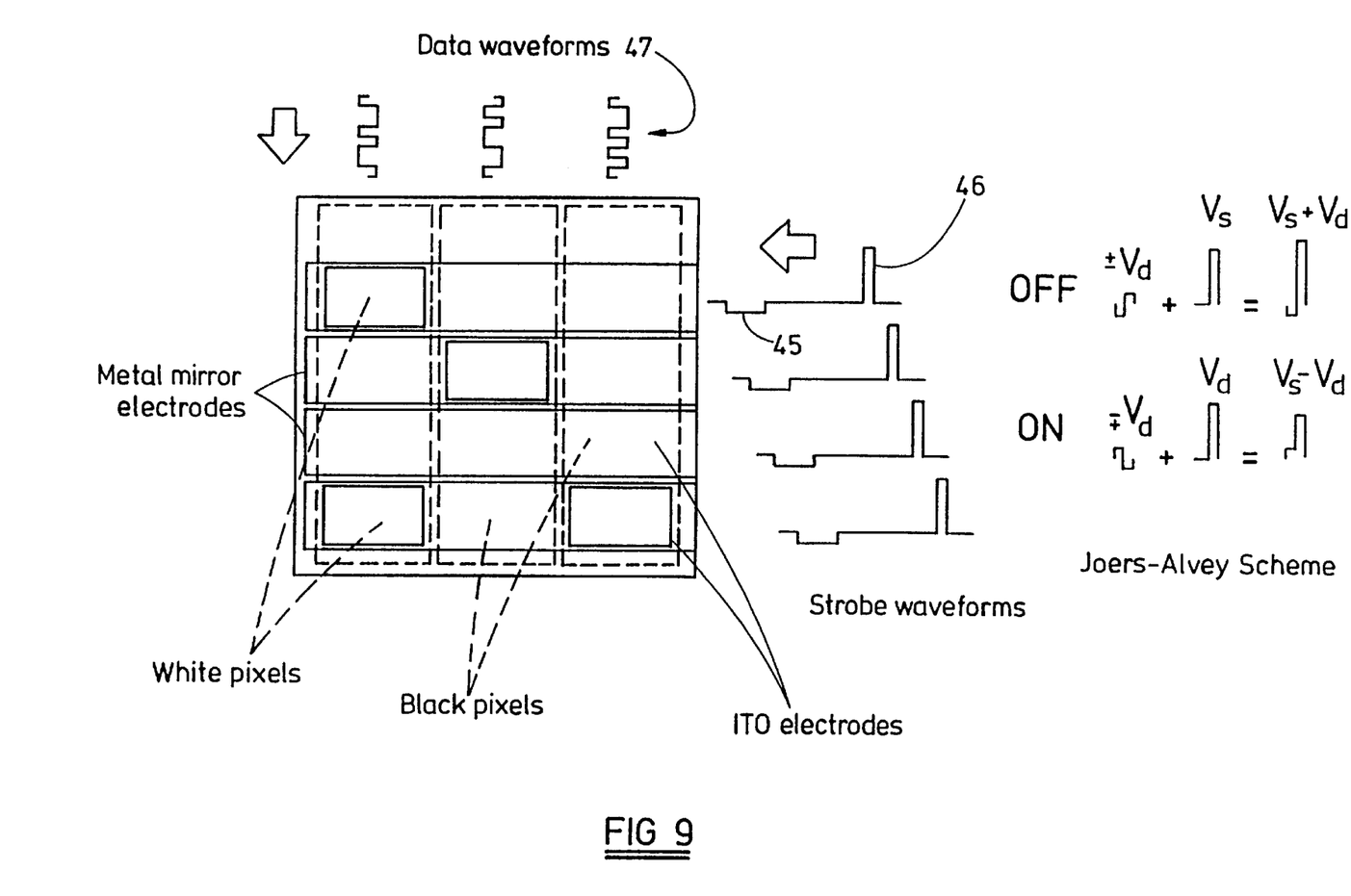
FIG. 9 is a diagrammatic illustration of addressing waveforms for use with the SLMs illustrated in FIGS. 3 to 8.

The actual strobe and data waveforms may be those which are conventionally used for addressing ferroelectric liquid crystal displays. Such techniques are disclosed in "The JOERS/ALVEY Ferroelectric Multi-Plexing Scheme", P. W. H. Surguy et al, Ferroelectrics 122 pp 63–79 (1991) and in "A New Set of High Speed Matrix Addressing Schemes for Ferroelectric Liquid Crystal Displays", J. R. Hughes and E. P. Raynes, Liq.Cryst.13 pp 597–601, 1993. Waveforms suitable for use with the panels and pixels shown in FIGS. 3 to 8 of the JOERS/ALVEY type are illustrated in FIG. 9. Each of the strobe signals comprises a blanking pulse 45 followed by a strobe pulse 46 of opposite polarity, larger amplitude and shorter duration. The data waveforms are illustrated at 47 and comprise contiguous pulses of equal amplitude but opposite polarity, each pulse having the same period as the strobe pulses 46. The right hand side of FIG. 9 illustrates the combinations of strobe and data pulses for switching the pixels to the diffractive state "ON" or for leaving the pixels in the blanked non-diffractive state "OFF".

Figure 10:
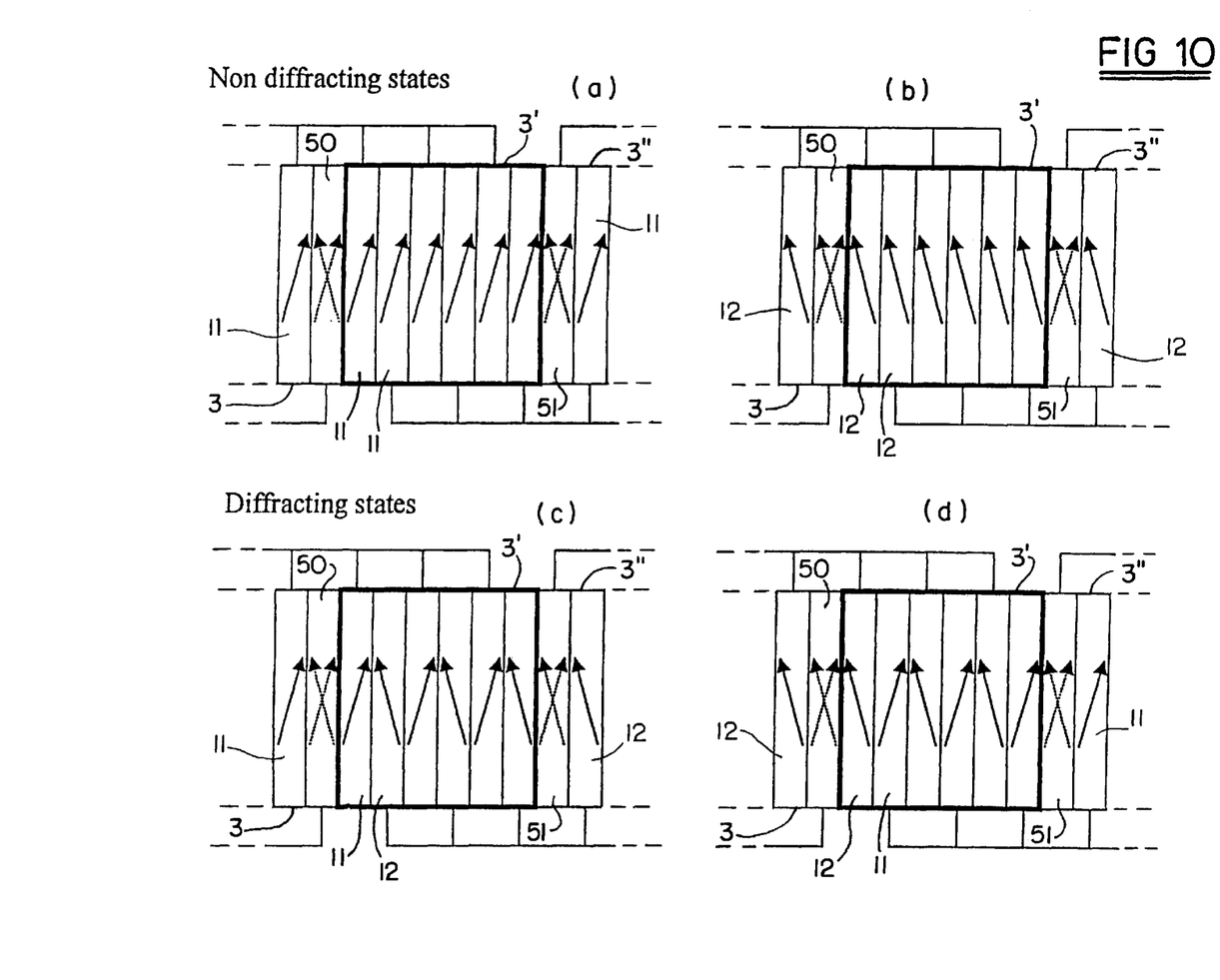
FIG. 10 is a diagram illustrating at (a) to (d) four possible states of a pixel.

FIG. 10 illustrates at (a) to (d) the four possible states of a typical pixel 3' and the effect on the adjacent pixels 3 and 3". Non-diffracting states are shown at (a) and (b) whereas diffracting states are shown at (c) and (d).

As shown at (a), all of the strips of the pixel 3' are in the state 11. Because of the interconnections of the electrodes with the adjacent pixels, alternate strips of the pixel 3 and of the pixel 3" are in the state 11. However, the remaining strips such as 50 and 51 of the pixels 3 and 3" can be in any arbitrary state so that the pixels 3 and 3" may be controlled so as to be diffracting or non-diffracting in respective of the specific state of the pixel 3' shown at (a).

The other non-diffracting state of the pixel 3' is shown at (b). In this case, all of the strips of the pixel ' are in the state 12 as are alternate strips of the adjacent pixels 3 and 3". Again, the remaining strips such as 50 and 51 of the pixels 3 and 3" can be in either state so that the pixels 3 and 3" maybe diffracting or non-diffracting as desired and irrespective of the state of the pixel 3'.

As shown (c), alternate strips of the pixel 3' are in different states 11 and 12. Thus, alternate strips of the pixel 3 are in the state 11 whereas alternate strips of the pixel 3" are in the state 12. However, the remaining strips 50 and 51 of the pixels 3 and 3" maybe in either state so that the states of the pixels 3 and 3" maybe selected in independently and irrespective of the state of the pixel 3'. Similarly, as shown at (d), the states of the strips of the pixel 3' are reversed compared with the states illustrated at (c) but again the adjacent pixels 3 and 3" may be controlled to be in either state as desired and irrespective of the state of the pixel 3'. Accordingly, all of the pixels are independently controllable despite the reduction in the number of connections required by the "electrode sharing" arrangement.

Figures 11, 12:
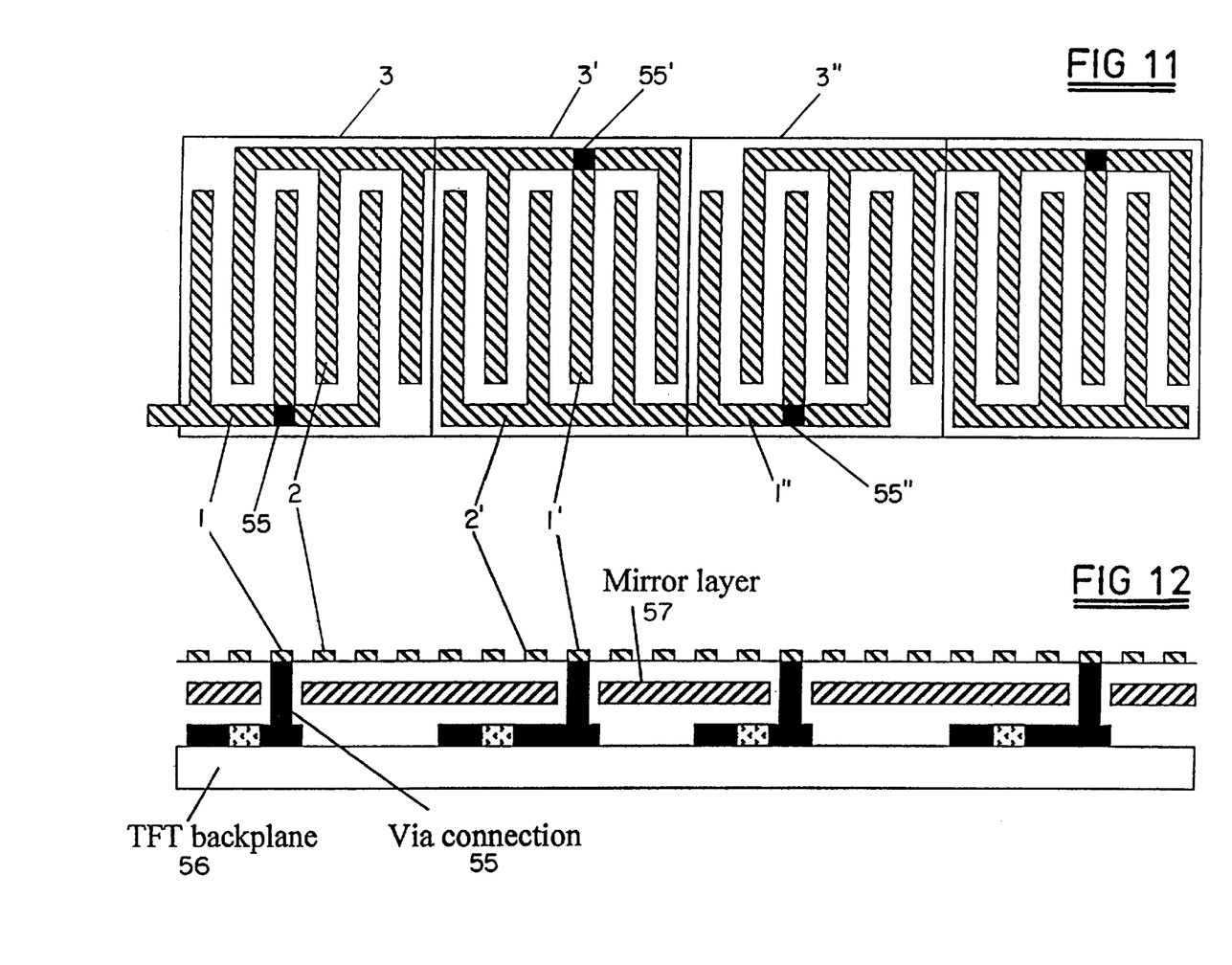
FIG. 11 illustrates an SLM electrode arrangement for active matrix addressing.
FIG. 12 is a cross-sectional view of an active matrix substrate.

The arrangements described hereinbefore and illustrated in FIGS. 5 and 7 to 9 are of the passive matrix addressing type. However, active matrix addressing may also be used with a shared electrode arrangement for pixels of the type illustrated in FIGS. 3 and 4. FIG. 11 illustrates the intedigitated electrode arrangement for an active matrix SLM. In this case, the second electrode 2 of the pixel 3 is connected to the first electrode 1' of the adjacent pixel 3'. Similarly, the second electrode 2' of the pixel 3' is connected to the first electrode 1" of the adjacent pixel 3". However, as illustrated at 55, 55', and 55", only a single via connection is required for the indigitated first and second electrodes at each pixel. Thus, compared with the non-shared electrode arrangement of known type, the number of connections is reduced by approximately 50%.

FIG. 12 illustrates an active matrix addressing substrate in simplified form. The substrate comprises a thin film transistor (TFT) back plane 56 on which is formed a mirror layer 57 which may be metallic or dielectric. The via connections such as 55 extend through the layer 57 so as to provide a connection between the interdigitated electrodes and the back plane 56. The electrodes such as 1 and 2 are formed above the layer 57. To complete an active addressing arrangement, the facing substrate (not shown) carries a transparent continuous third electrode which is common to all of the pixels of the modulator.

In order to avoid electrochemical degradation of the FLC, it is desirable for the waveforms appearing across the strips of FLC in each pixel to be DC balanced. Accurate balancing can be provided by applying each frame of data twice with the data and strobe waveforms having inverted polarity during the second frame. However, such an arrangement doubles the frame refresh time or halves the permitted line address time. Adequate results can be achieved by inverting the polarities of the strobe and data waveforms periodically, for instance after each frame of data. Although this technique does not provide wholly accurate DC balancing where image data change from frame to frame, balancing is generally sufficient to avoid any substantial electrochemical degradation and involves no sacrifice in frame refresh time or line addressing time.

Although the preferred embodiments have been described for ferroelectric liquid crystals, other liquid crystal materials may be used, such as nematic liquid crystals, anti-ferroelectric liquid crystals (AFLC) and particularly highly twisted non-linear material structures such as super twisted nematic (STN) materials. Also, these techniques may be applied to non liquid crystal embodiments and even to non-electrooptic embodiments, such as grating light valves (GLVs) as disclosed in "Deformable Grating Light Valves for High-Resolution Displays", Apte et al, SID 1993, pp 807–8. Also, although passive addressing arrangements have been described, the same techniques may be applied to active addressing arrangements in which the interdigitated electrodes are defined and driven actively, for instance by standard addressing electronics such as of DRAM type architecture. In this case, each pixel has electrodes shared between adjacent nodes (i.e. thin film transistors) of the addressing architecture.

It is possible to use an AFLC in a passively addressed modulator. In this case, the more typical hysteretic AFLC voltage-transmissivity relationship is required. (The use of an AFLC having such a voltage-transmission characteristic with a holding voltage to provide passive matrix operation is known). This mode has similar optical characteristics to the FLC mode described hereinbefore and is capable of achieving analogue or grey level operation through domain growth.

AFLC modes may also be used with active matrix addressing. In this case, the ideal AFLC mode requires a threshold less AFLC in which the voltage-transmission relationship does not exhibit the typical hysteretic loop. Binary (on/off) or analogue (grey level) operation may be provided in this mode.

A modulator of the type described hereinbefore may also be embodied using a bistable twisted nematic (BTN) liquid crystal in an active matrix addressing arrangement. For example, a cholesteric doped nematic liquid crystal material having a pitch of approximately twice the cell gap in an anti-parallel aligned cell produces a splayed 180° twist state and two splayed metastable states with 0° and 360° twist. The two metastable states provide a bistable mode of operation for the liquid crystal. The liquid crystal can be switched between the metastable states by applying a reset pulse, which produces a temporary homeotropic state, followed by a select pulse to select one of the two metastable states. The metastable states may be rapidly accessed and represent the bistable states. However, the BTN mode can operate in other ways, for instance with passive matrix addressing and in the analogue mode to provide grey levels. Also, other BTN configurations may be used.

What is claimed is:

1. A spatial light modulator comprising at least three picture elements, each of which comprises a plurality of first elongate electrodes which are connected together and a plurality of second elongate electrodes which are connected together and which are interdigitated with the first electrodes, wherein, the first elongate electrodes of a second of the picture elements are connected to the second elongate electrodes of a first of the picture elements and the second electrodes of the second picture element are connected to the first electrodes of a third of the picture elements, and wherein, the at least three picture elements form at least one row of n picture elements where n is an integer greater than two, the first electrode of each ith picture element being connected to the second electrode of the (i−1)th picture element and the second electrode of each ith picture element being connected to the first electrode of the (i+1)th picture element, where i is each integer satisfying 1<i<n.

2. A modulator as claimed in claim 1, wherein the at least one row of n picture elements includes a third electrode which is common to the n picture elements.

3. A modulator as claimed in claim 1, wherein the at least three picture elements form a plurality of columns of picture elements, the first electrodes of the picture elements of each column being connected together and the second electrodes of the picture elements of each column being connected together.

4. A modulator as claimed in claim 1, wherein the at least one row of n picture elements form a plurality of groups of rows of picture elements, each group comprising a plurality of columns of picture elements, the first electrodes of the picture elements of each column of each group being connected together and the second electrodes of the picture elements of each column of each group being connected together.

5. A modulator as claimed in claim 1, wherein the first and second electrodes are connected to a digital signal generator.

6. A modulator as claimed in claim 1, further comprising an active matrix addressing arrangement connected to the first electrodes of each of the picture elements.

7. A modulator as claimed in claim 1, further comprising a layer of electro-optic material.

8. A modulator as claimed in claim 7, wherein the electro-optic material comprises a liquid crystal.

9. A modulator as claimed in claim 8, wherein the liquid crystal is a ferroelectric liquid crystal.

10. A modulator as claimed in claim 1, wherein the picture elements are arranged as groups of m adjacent picture elements of different areas, where m is an integer greater than one.

11. A display comprising a modulator as claimed in claim 1, a light source for illuminating the modulator, and an optical system for gathering light from the modulator.

12. A display as claimed in claim 11, wherein the optical system is arranged to gather light diffracted by the picture elements of the modulator.

13. A display as claimed in claim 11, wherein the optical system is a projection optical system.

* * * * *